Figure 1:
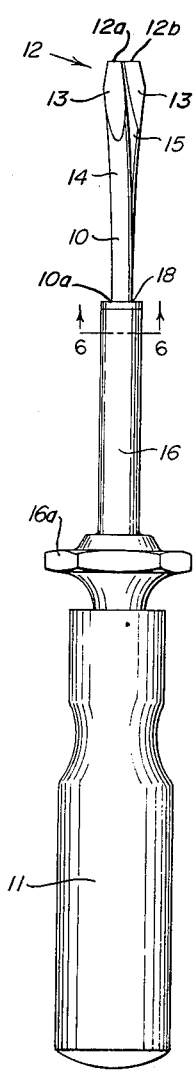

Dec. 21, 1965     C. M. OSBORN ETAL     3,224,479

EXPANDING BIT SCREW DRIVER

Filed Jan. 10, 1964

INVENTOR.
CAROLUS M. OSBORN
FRANK J. DAVIS
BY *Mallinckrodt and Mallinckrodt*
ATTORNEYS

United States Patent Office 3,224,479
Patented Dec. 21, 1965

3,224,479
EXPANDING BIT SCREW DRIVER
Carolus M. Osborn and Frank J. Davis, Salt Lake City,
Utah, assignors to Kedman Company, Salt Lake City,
Utah, a corporation of Utah
Filed Jan. 10, 1964, Ser. No. 336,926
3 Claims. (Cl. 145—50)

This invention relates to expanding bit screw drivers and constitutes an improvement on the screw driver of this type which is the subject of United States Letters Patent Number 2,445,383 issued to G. W. Barlow on July 20, 1948.

The Barlow screw driver comprises a shaft or shank, which is split longitudinally into two parts and has those parts bent and shaped at one end to provide a composite but rectilinear, screw-engaging tip or bit capable of being expanded in effective thickness to tightly grip a screw after being inserted in the receiving slot or kerf thereof. A close-fitting, elongate sleeve is slidably mounted on the shank immediately below the handle of the screw driver, and serves to actuate the composite tip or bit into expanded, gripping relationship with the defining walls of the slot or kerf of the screw when pushed along the shank toward such tip or bit. When the sleeve is pulled back, the bit is returned to its normal rectilinear and non-gripping condition by reason of the inherent resiliency of the shank parts.

As illustrated in the afore-referred-to-patent, it has been necessary to reduce the transverse dimensions of the respective shank parts longitudinally along the line of action of the sleeve, so outward bowing of these resilient parts—caused by displacement of the bit parts from their normal rectilinear alignment—will not press against and bind the close-fitting sleeve to prevent its sliding movement longitudinally of the shank.

In the manufacture of this screw driver through the years, this necessary reduction in transverse dimension has required the grinding away and polishing of intermediate longitudinal portions of the two half-round, spring steel pieces used to fabricate the shank. It has also required the use of a carefully processed metal tube for the sleeve. Although there has been a large demand for the product, because of its convenience and efficency in use, production has been hampered by this need for reducing the transverse dimensions of the shank parts longitudinally thereof intermediate their lengths and cost have been higher than desirable.

A principal object in the making of the present invention was to facilitate production and reduce manufacturing costs by eliminating the need for these special manufacturing steps.

This object was accomplished in a simple but highly effective manner by increasing the interval diameter of the elongate sleeve so it no longer closely hugs the composite shank, but, instead, provides clearance against binding, and by providing, at the ends of the sleeve, collar portions which do closely hug the composite shank as guides and actuating means. In this way, the required action on the shank is carried out by one or both of the collars, without binding, and the sleeve still extends along the shank to the handle, where it is easily grasped and pushed or pulled, as the case may be, by the user of the tool.

There is shown in the accompanying drawing a specific embodiment of the invention representing what is presently regarded as the best mode of carrying it out in practice. From the detailed description of this presently preferred form, other more specific objects and features of the invention will become apparent.

Figure 2:
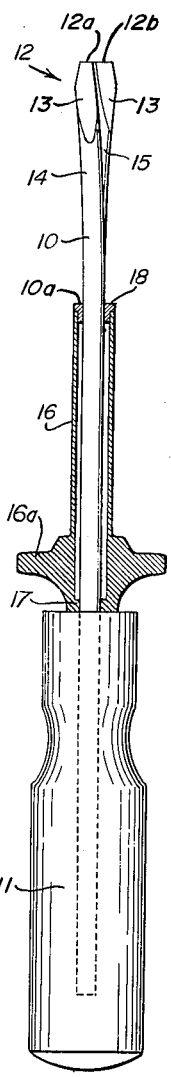
Figure 3:
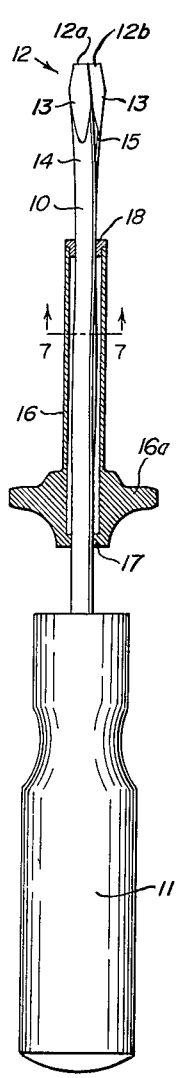
Figure 4:
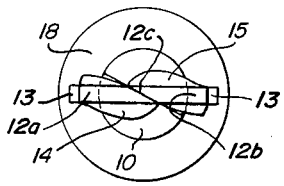
Figure 5:
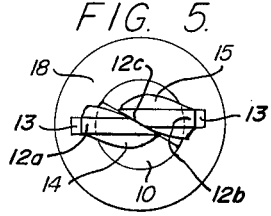
Figure 6:
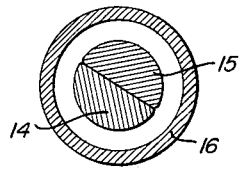

In the drawing:

FIG. 1 represents an elevation of the screw driver, with its bit in condition for insertion in the receiving slot or kerf of a screw;

FIG. 2, a corresponding view, with the actuating sleeve shown in central, longitudinal section;

FIG. 3, a view similar to that of FIG. 2, but taken after the actuating sleeve has been pushed down the shank to expand the bit into screw-engaging position, outward bowing of the shank parts being somewhat exaggerated for purposes of illustration;

FIG. 4, an end elevation looking toward the screw-engaging bit in FIG. 1;

FIG. 5, a similar view taken with respect to FIG. 3;

FIG. 6, a transverse section taken on the line 6—6 of FIG. 1; and

Figure 7:
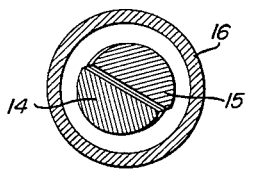

FIG. 7, a similar view but taken on the line 7—7 of FIG. 3.

Referring to the drawing:

As in the disclosure of the Barlow patent, the illustrated screw driver has a longitudinally split shaft or shank 10 extending from a conventional handle 11 and having a composite, normally rectilinear but expanding bit 12 with longitudinally tapered, laterally projecting, bit-expanding interceptors 13 extending backwardly from the bit toward the handle.

Shank 10 is customarily made by placing two equal lengths 14 and 15 of standard half-round, high carbon, spring steel together in flat-face to flat-face, coextensive relationship and welding them at one end. Handle 11 is applied to that end. In making the composite bit 12, the opposite ends of the two elongate and resilient shank parts 14 and 15 are bent oppositely outwardly, laterally of the adjoining faces, and are squared off and ground. This gives the required normal rectilinear alignment of the laterally displaced, expandable parts 12a and 12b of the bit and provides the bit-expanding interceptors 13, that extend backwardly up the shank to final mergence intermediate the length of the shank, as shown at 10a. Such parts 12a and 12b, as usual, are serially positioned side-by-side and in mutually contiguous relationship along a relatively short, diagonally oriented slip plane 12c, FIGS. 4 and 5.

Unlike the close-fitting, actuating sleeve of the Barlow patent, an elongate actuating sleeve 16, having relatively short, close-fitting collars 17 and 18 at its opposite ends, is positioned on the shank 10 for sliding movement therealong to engage and press toward each other the interceptors 13 as in FIGS. 3 and 7. Intermediate the end collars, sleeve 16 has an internal diameter exceeding that of the shank 10 when the interceptors are engaged and bit 12 is expanded (and shank parts 14 and 15 being bowed outwardly as a consequence), whereby such intermediate portion of the sleeve is substantially free and clear of the shank and is free from bind. It is unnecessary to grind and polish the rounded portions of shank parts 14 and 15 along their lengths between the handle and the bit, as in the past. These are merely left with their original uniform transverse dimensions along their lengths. Moreover, the sleeve may now be fabricated from a length of plastic tubing or may be directly molded from a plastic material.

As illustrated, sleeve 16 is molded from plastic to include the collar 17, and collar 18 is a metal fitting secured therein. It is no longer necessary to cut lengths of close-fitting metal tubing, ream the ends, clean, and plate with a smooth surfacing material such as nickel.

The close-fitting sleeve of previous manufacture was made of metal tubing for the sake of smooth sliding action and rigidity. For electrical work, it was necessary to slip an insulating plastic cover over the sleeve.

With the present construction, it is not only feasible but entirely practical and preferable to mold the entire sleeve 16, including the finger-engagement portion 16a thereof and the collar 17, of an electrically insulating plastic material, or, if desired, to fabricate the several portions of the sleeve separately from plastic stock material and to secure them together by a plastic cement. Thus, it is not now necessary to make special provision for electrical use. Moreover, the sleeve as presently constructed is easier to operate by a finger of the hand holding the screw driver, because there is less frictional resistance to sliding movement. In this connection, it should be noted that the degree of closeness of fit of the collars 17 and 18 can be established in the design of the tool to provide an optimum degree of resistance for easy sliding movement without undue freedom of action.

In addition, the fact that no material is removed from the shank—as it was formerly by grinding—gives greater strength for driving screws, and the fact that the portion of the shank within the sleeve is free to flex as the composite tip is being expanded eliminates counter spring action at the tip portion of the shank to a greater extent than the previous grinding did and effects a more secure grip of such tip on the screw.

Whereas there is here illustrated and specifically described a certain preferred construction of apparatus which is presently regarded as the best mode of carrying out the invention, it should be understood that various changes may be made and other constructions adopted without departing from the inventive subject matter particularly pointed out and claimed herebelow.

We claim:

1. An expanding bit screwdriver, comprising a handle; a longitudinally split shank, including a pair of half-round, elongate, resilient parts mounted together at one end in the handle in flat face to flat face, coextensive relationship and extending therefrom with laterally displaced portions having bit members serially related side by side and mutually contiguous along a relatively short, diagonally oriented slip plane to form an elongate, composite, normally rectilinear bit at the opposite end of the shank and longitudinally tapered, bit-expanding interceptors extending backwardly from said bit toward the handle, each of said parts being of substantially uniform transverse dimension along its length from the handle to the interceptor and normally fitting closely together, but bowing outwardly when the bit is expanded along said slip plane; and an elongate sleeve encircling and extending longitudinally of that portion of the shank, forwardly of the handle, in which the said parts are of uniform transverse dimensions, and being slidable along the shank, said sleeve having relatively short collars closely encircling the shank to guide forward and backward sliding movement of said sleeve therealong and to expand said bit by acting on said interceptors during said forward movement, to force the corresponding portions of the shank inwardly toward each other, the remainder of the length of said sleeve being spaced sufficiently from the shank to prevent binding when said sleeve is slid along the shank for expanding said bit.

2. An expanding bit screwdriver according to claim 1, wherein the elongate sleeve is of an electrically insulating material.

3. An expanding bit screwdriver according to claim 1, wherein the sleeve includes a finger-engagement portion at its end adjacent to the handle, and wherein the sleeve, said finger-engagement portion thereof, and at least one of the collars are molded integrally from a plastic material.

References Cited by the Examiner

UNITED STATES PATENTS 2,669,896   2/1954   Clough _____ 81—43 X

FOREIGN PATENTS 222,808   12/1957   Australia.
166,083   6/1950   Austria.
523,088   4/1931   Germany.

WILLIAM FELDMAN, *Primary Examiner.*

MILTON S. MEHR, *Examiner.*